United States Patent
Nir et al.

(10) Patent No.: US 11,900,961 B2
(45) Date of Patent: Feb. 13, 2024

(54) MULTICHANNEL AUDIO SPEECH CLASSIFICATION

(71) Applicant: Microsoft Technology Licensing, LLC, Redmond, WA (US)

(72) Inventors: Oron Nir, Herzeliya (IL); Inbal Sagiv, Kfar-Saba (IL); Maayan Yedidia, Ramat Gan (IL); Fardau Van Neerden, Driel (NL); Itai Norman, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,606

(22) Filed: May 31, 2022

(65) Prior Publication Data
US 2023/0386505 A1    Nov. 30, 2023

(51) Int. Cl.
*G10L 25/69*    (2013.01)
*G10L 25/21*    (2013.01)
(Continued)

(52) U.S. Cl.
CPC ............ *G10L 25/69* (2013.01); *G10L 19/008* (2013.01); *G10L 19/173* (2013.01); *G10L 25/06* (2013.01); *G10L 25/21* (2013.01)

(58) Field of Classification Search
CPC ....... G10L 19/173; G10L 25/06; G10L 25/21; G10L 25/69
See application file for complete search history.

(56) References Cited

U.S. PATENT DOCUMENTS 5,794,188 A * 8/1998 Hollier ................ H04B 3/46
                                                    704/E19.002
6,308,222 B1 * 10/2001 Krueger ............... H04L 67/34
                                                    375/E7.129
(Continued)

FOREIGN PATENT DOCUMENTS

EP         3948848 A1    2/2022
KR      102230667 B1    3/2021

OTHER PUBLICATIONS

"Detect Different Speakers in an Audio Recording", Retrieved from: https://web.archive.org/web/20220215181220/https:/cloud.google.com/speech-to-text/docs/multiple-voices, Feb. 15, 2022, 6 Pages.

(Continued)

*Primary Examiner* — Samuel G Neway (57) ABSTRACT

Examples of the present disclosure describe systems and methods for multichannel audio speech classification. In examples, an audio signal comprising multiple audio channels is received at a processing device. Each of the audio channels in the audio signal is transcoded to a predefined audio format. For each of the transcoded audio channels, an average power value is calculated for one or more data windows in the audio signal. A correlation value is calculated between the average power value for each audio channel and the combined average power value of the other audio channels in the audio signal. Each of the correlation values (or an aggregated correlation value for the audio channels) is then compared against a threshold value to determine whether the audio signal is to be classified as a speech-based communication. Based on the classification, an action associated with the audio signal may be performed.

20 Claims, 8 Drawing Sheets

(51) Int. Cl.
  *G10L 25/06* (2013.01)
  *G10L 19/16* (2013.01)
  *G10L 19/008* (2013.01)

(56) References Cited

U.S. PATENT DOCUMENTS

| | | | | |
|---|---|---|---|---|
| 8,890,953 | B1* | 11/2014 | Coley | H04N 23/695 |
| | | | | 348/143 |
| 10,614,812 | B2 | 4/2020 | Ramprashad et al. | |
| 11,120,802 | B2 | 9/2021 | Church et al. | |
| 2005/0102137 | A1 | 5/2005 | Zinser et al. | |
| 2008/0082095 | A1* | 4/2008 | Shores | A61B 18/1206 |
| | | | | 606/34 |
| 2012/0163622 | A1* | 6/2012 | Karthik | H04R 3/005 |
| | | | | 381/94.1 |
| 2015/0248895 | A1* | 9/2015 | Matsumoto | G10L 25/84 |
| | | | | 704/206 |
| 2017/0148447 | A1* | 5/2017 | Atti | G10L 25/51 |
| 2017/0302240 | A1* | 10/2017 | Robinson | G06F 3/165 |
| 2019/0080703 | A1* | 3/2019 | Chebiyyam | G10L 19/008 |
| 2019/0139563 | A1 | 5/2019 | Chen et al. | |
| 2019/0356521 | A1* | 11/2019 | Okuhata | H04L 27/14 |
| 2020/0005770 | A1* | 1/2020 | Lunner | H04R 25/407 |
| 2020/0090040 | A1* | 3/2020 | Pineda de Gyvez | G06F 3/011 |
| 2020/0168241 | A1* | 5/2020 | Leong | G10L 25/51 |
| 2021/0152967 | A1* | 5/2021 | Deruty | H04S 1/007 |
| 2021/0407520 | A1 | 12/2021 | Neckermann et al. | |
| 2022/0245483 | A1* | 8/2022 | Xu | G06N 20/00 |
| 2022/0335966 | A1* | 10/2022 | Ayllón Álvarez | G10L 15/02 |

OTHER PUBLICATIONS

Pardo, et al., "Speaker Diarization For Multiple-Distant-Microphone Meetings Using Several Sources of Information", In Journal of IEEE Transactions on Computers, vol. 56, Issue 9, Sep. 2007, pp. 1212-1224.

Shen, et al., "The Volcspeech System for The Icassp 2022 Multi-Channel Multi-Party Meeting Transcription Challenge", In Repository of arXiv:2202.04261v2, Feb. 10, 2022, 5 Pages.

Brown, et al., "Speech and Crosstalk Detection in Multichannel Audio", In Proceeding of IEEE Transactions on Speech and Audio Processing, vol. 13, Issue 1, Jan. 1, 2005, pp. 84-91.

"International Search Report and Written Opinion issued in PCT Application No. PCT/US2023/018407", dated Jul. 27, 2023, 12 Pages.

Pfau, et al., "Multispeaker Speech Activity Detection for the ICSI Meeting Recorder", In Proceeding of IEEE Workshop on Automatic Speech Recognition and Understanding, Dec. 9, 2001, pp. 107-110.

* cited by examiner

MULTICHANNEL AUDIO SPEECH CLASSIFICATION

BACKGROUND

Audio signals comprise audio channels that communicate sound from an audio source. In many cases, multiple audio channels of an audio signal are converted into a single monophonic channel in preparation for applying speech recognition techniques to the audio signal. However, during the conversion to the monophonic channel, speaker information from the audio channels is lost and speech overlap is injected into the monophonic channel.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for multichannel audio speech classification. In examples, an audio signal comprising multiple audio channels is received at a processing device. Each of the audio channels in the audio signal is transcoded to a predefined audio format. For each of the transcoded audio channels, an average power value is calculated for one or more data windows in the audio signal. A correlation value is calculated between the average power value for each audio channel and the combined average power value of the other audio channels in the audio signal. Each of the correlation values (or an aggregated correlation value for the audio channels) is then compared against a threshold value to determine whether the audio signal is to be classified as a speech-based communication. Based on the classification, an action associated with the audio signal may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Audio and video files typically include audio signals that capture sound using one or more audio channels, such as a monophonic channel (uses a single channel), stereophonic channels (uses two channels), or multi-phonic channels (uses three or more channels, such as used in surround sound). The audio channels may comprise the same audio content, similar audio content (e.g., music of different instruments balanced with slight variations in sound, such as pitch, tone, or amplitude), or different audio content (e.g., a teleconference where each speaker uses a separate audio channel). Audio content, as used herein, refers to data describing the amplitude over time of a sound wave representing an audio signal. In examples, the data is voltages of an audio signal and is represented as values between +1.0 and −1.0. In at least one example, each discrete data point (value) within the data is referred to as a sample.

Sound recognition techniques, such as speech-to-text, speaker diarization, and acoustic event detection, are often applied to audio signals to convert the audio signals into an alternative format. Speech-to-text, as used herein, refers to the recognition and translation of spoken language into text. Speaker diarization, as used herein, refers to partitioning an audio signal into segments according to speaker identity. Acoustic event detection, as used herein, refers to processing acoustic signals, which include n on-speech signals, to convert the acoustic signals into symbolic descriptions of the corresponding sound events.

Typically, the conversion of the audio signals includes transcoding the audio signals into a single monophonic channel, regardless of the number of channels included within the audio signals. When an audio signal comprising multiple channels of speech-based content is converted into a monophonic channel, speaker information (e.g., speaker identity and speaker-specific timestamps for speech) from the audio channels is lost and speech overlap is injected into the monophonic channel (e.g., audio content from two different audio channels and occurring during the same time period is combined or condensed). Sound recognition techniques are then applied to the monophonic channel. However, the lost speaker information and the speech overlap injected into the monophonic channel typically results in the suboptimal or ineffective application of the sound recognition techniques to the monophonic channel. As a specific example, when speaker diarization is performed on the monophonic channel, it is challenging to identity and separate speech that has been combined from multiple audio channels. Thus, it is similarly difficult to assign speaker identities to segments of the audio signal.

Embodiments of the present disclosure address the challenges of the above-described sound recognition techniques and describe systems and methods for multichannel audio speech classification. In examples, an audio signal comprising multiple audio channels is received at a processing device. An audio signal, as used herein, refers to a representation of sound that typically includes one or more electrical voltages (for analog signal) or binary numbers (for digital signals). An audio channel, as used herein, refers to a communication channel in which audio content is transported from an audio source, such as a microphone, to a destination point, such as a speaker.

Each of the audio channels in the audio signal is transcoded to a predefined audio format. Transcoding, as used herein, refers to converting data from a first encoding format to a second encoding format. For each of the transcoded audio channels, an average power value is calculated for one or more data windows in the audio signal. The average power value indicates the average amplitude (volume) of the audio signal during the data window. In some examples, a data window is defined by a stride length and a window size. In some such examples, the stride length refers to the number of samples between data windows and the window size refers to the number of samples within the data window. In other examples, the stride length and the window size are durations of time. For instance, the stride length can refer to a duration of time between data windows and the window size can refer to a duration of time for the data window.

In examples, the average power value of a data window is calculated using the following equation:

$$P_x = \frac{1}{N}\sum_{n=0}^{N-1} |x_n|^2$$

In the above equation, $P_x$ is the average power value of the data window, x is the amplitude of a sample, n is the sample number, and N is the number of samples in the data window. Although a specific equation for calculating the average power value of a data window is discussed herein, it is contemplated that the average power value of a data window can be calculated using alternative equations or methods.

The average power values for the data windows of each audio channel are compared to determine a correlation value between respective data windows. For example, the average power value for a first data window of a first audio channel is compared to the average power value for a first data window of a second audio channel, the average power value of a second data window of the first audio channel is compared to the average power value of a second data window of the second audio channel, and so on. In some examples, the average power values for the data windows of an audio channel are compared to the combined average power values for the data windows of the other audio channels in the audio signal. For example, the average power value of a first data window of a first audio channel is compared to the sum of the average power values for a first data window of a second audio channel and a first data window of a third audio channel, the average power value of a second data window of the first audio channel is compared to the sum of the average power values for a second data window of the second audio channel and a second data window of a the third audio channel, and so on.

The correlation values for the data windows identify whether there is a positive correlation or a negative correlation between data windows. A positive correlation indicates that the average power value for a corresponding data window for each audio channel (or grouping of audio channels) was either zero (or approximately zero) for both data windows or non-zero for both data windows. The strength of a positive correlation may be based on the numerical difference between the average power values for corresponding data windows. For instance, a positive correlation may be strongest when the average power values for corresponding data windows are an exact match. A negative correlation indicates that the average power value for a data window for a first audio channel was either zero (or approximately zero) and the average power value for the corresponding data window for a second audio channel (or grouping of audio channels) was non-zero. The strength of a negative correlation may be based on the numerical difference between the average power values for corresponding data windows. For instance, a negative correlation may be stronger when the numerical difference between the average power values for corresponding data windows is larger. In one example, an average power value of zero (or approximately zero) represents that no sound was recorded for either of the data windows (e.g., speakers corresponding to each of the audio channels were not speaking or were silent). In contrast, an average power value of non-zero represents that sound was recorded for both of the data windows (e.g., speakers corresponding to each of the audio channels were speaking concurrently).

In some examples, the correlation values are determined using Pearson correlation. Pearson correlation measures the strength of the linear relationship between two data values as a value between +1.0 and −1.0, where +1.0 represents a perfect correlation, −1.0 represents a perfect negative correlation, and zero (0) represents no correlation. In other examples, alternative methods are used to determine the correlation values.

The correlation values for each data window of the audio channels are compared to a threshold value to determine a classification of the audio signal. Alternatively, an overall correlation value for the audio channels may be generated and compared to the threshold value. Generating the overall correlation value may include performing one or more mathematic operations on the correlation values for the data windows, such as calculating an average, a sum, a dot product, etc. As a specific example, a first data window for two audio channels has a correlation value of +0.2, a second data window for the two audio channels has a correlation value of −0.4, and a third data window for the two audio channels has a correlation value of −0.4. The correlation values for each window may be averaged (e.g., (+0.2+−0.4+−0.4)/3)) to calculate an overall correlation value of −0.2 for the two audio channels. In examples, the threshold value represents a correlation value at which there is a high probability, which may be validated empirically, that the audio signal corresponds to a particular audio classification.

A classification for the audio signal is determined based on the comparison of the correlation value(s) to the threshold value. As one example, if an overall correlation value for the audio channels is equal to or below a threshold value, the audio signal may be determined to correspond to a particular classification of speech. If the overall correlation value for the audio channels is above the threshold value, the audio signal may be determined to correspond to a different classification of speech or the audio signal may not be classified. In another example, the classification of the audio signal is based on the number of data window correlation values that are equal to or below a threshold value. For instance, a first classification may be determined if greater than 66% of the correlation values are below the threshold value, a second classification may be determined if greater than 33% of the correlation values are below the threshold value; and a third classification may be determined if less than or equal to 33% of the correlation values are below the threshold value.

In examples, the classifications for the audio signal correspond to various types of speaker communications and sounds. As one example, an audio signal may correspond to multi-speaker speech (e.g., speech between two or more speakers) where each speaker provides at least a certain amount of speech (e.g., a conversation or a similar two-way discourse). As another example, an audio signal may correspond to single speaker speech (e.g., speech by one speaker or between two or more speakers) where a single speaker provides most, if not all, of the speech (e.g., a lecture or a monologue). As another example, an audio signal may correspond to speech comprising non-speech audio elements (e.g., music, a laugh track, or other noise effects) where a speaker's speech is accompanied by background sounds (e.g., a movie, a television show, a musical performance). As another example, an audio signal may correspond to non-speech, such as a sound notification (e.g., an alarm, a siren, or an alert) or another type of acoustic event (e.g., the sound of glass breaking, a dog barking, or an automobile accident).

Based on the classification for the audio signal, an action may be performed. In one example, a sound recognition technique, such as speech-to-text or speaker diarization, is applied to an audio signal based on the classification for the audio signal. For instance, if an audio signal is classified as multi-speaker speech, speaker diarization may be performed on the audio signal to identify each speaker. The speaker diarization may include identifying segments of speech corresponding to each speaker and providing timestamps for each segment of speech. In another example, an indication is provided based on the classification for the audio signal. For instance, if an audio signal is classified as a sound notification, such as an alarm, an indication of the sound notification may be provided, such as text message, an instant message, or a recording of the audio signal. In another example, a corrective action is initiated based on the classification for the audio signal. For instance, if an audio signal is classified as an acoustic event that could be indicative of an injury, such as an automobile accident, the relevant authorities (e.g., a hospital, a police station, a fire station) may be contacted using an automated system.

Thus, the present disclosure provides a plurality of technical benefits and improvements over sound recognition solutions that are based on monophonic channel analysis. These technical benefits and improvements include: improving the accuracy of speech and non-speech classification for audio signals, providing discrete speech and non-speech classification for audio signals, improving the effectiveness of sound recognition techniques applied to audio signals, providing indications of determined audio signal classifications, and performing corrective actions based on determined audio signal classifications, among other examples.

Figure 1:
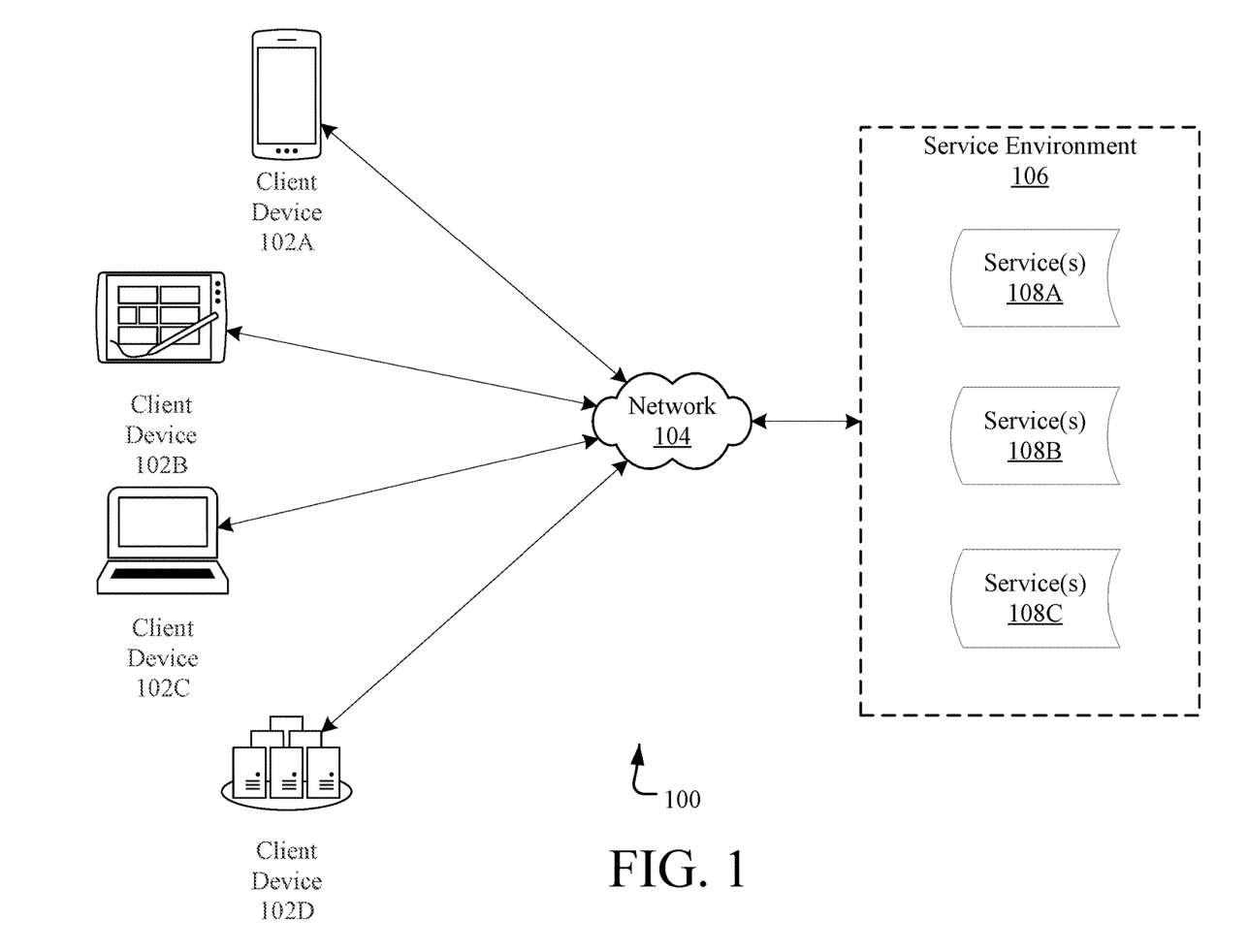
FIG. 1 illustrates an overview of an example system for multichannel audio speech classification.

FIG. 1 illustrates an overview of an example system for multichannel audio speech classification. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, components of systems disclosed herein are implemented on a single processing device. The processing device may provide an operating environment for software components to execute and utilize resources or facilities of such a system. An example of processing device(s) comprising such an operating environment is depicted in FIGS. 4-7. In another example, the components of systems disclosed herein are distributed across multiple processing devices. For instance, input may be entered on a user device or client device and information may be processed on or accessed from other devices in a network, such as one or more remote cloud devices or web server devices.

In FIG. 1, system 100 comprises client devices 102A, 102B, 102C, and 102D (collectively "client device(s) 102"), network 104, service environment 106, and service(s) 108A, 108B, and 108C (collectively "service(s) 108"). One of skill in the art will appreciate that the scale and structure of systems such as system 100 may vary and may include additional or fewer components than those described in FIG. 1. As one example, service environment 106 and/or service(s) 108 may be incorporated into client device(s) 102.

Client device(s) 102 may be configured to detect and/or collect input data from one or more users or user devices. In some examples, the input data corresponds to user interaction with one or more software applications or services implemented by, or accessible to, client device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, audio input, touch input, text-based input, gesture input, and/or image input. The input data may be detected/collected using one or more sensor components of client device(s) 102. Examples of sensors include microphones, touch-based sensors, geolocation sensors, accelerometers, optical/magnetic sensors, gyroscopes, keyboards, and pointing/selection tools. Examples of client device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices, and Internet of Things (IoT) devices.

Client device(s) 102 may provide the input data to service environment 106. In some examples, the input data is provided to service environment 106 using network 104. Examples of network 104 include a private area network (PAN), a local area network (LAN), a wide area network (WAN), and the like. Although network 104 is depicted as a single network, it is contemplated that network 104 may represent several networks of similar or varying types. In some examples, the input data is provided to service environment 106 without using network 104.

Service environment 106 is configured to provide client device(s) 102 access to various computing services and resources (e.g., applications, devices, storage, processing power, networking, analytics, intelligence). Service environment 106 may be implemented in a cloud-based or server-based environment using one or more computing devices, such as server devices (e.g., web servers, file servers, application servers, database servers), edge computing devices (e.g., routers, switches, firewalls, multiplexers), personal computers (PCs), virtual devices, and mobile devices. Alternatively, the service environment 106 may be implemented in an on-premises environment (e.g., a home or an office) using such computing devices. The computing devices may comprise one or more sensor components, as discussed with respect to client device(s) 102. Service environment 106 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)). In aspects, service environment 106 comprises or provides access to service(s) 108.

Service(s) 108 may be integrated into (e.g., hosted by or installed in) service environment 106. Alternatively, one or more of service(s) 108 may be implemented externally to service environment 106. For instance, one or more of service(s) 108 may be implemented in a service environment separate from service environment 106 or in client device(s) 102. Service(s) 106 may provide access to a set of software and/or hardware functionality. Examples of service(s) 106 include audio signal processing services, word processing services, spreadsheet services, presentation services, document-reader services, social media software or platforms, search engine services, media software or platforms, multimedia player services, content design software or tools, database software or tools, provisioning services, and alert or notification services.

Figure 2:
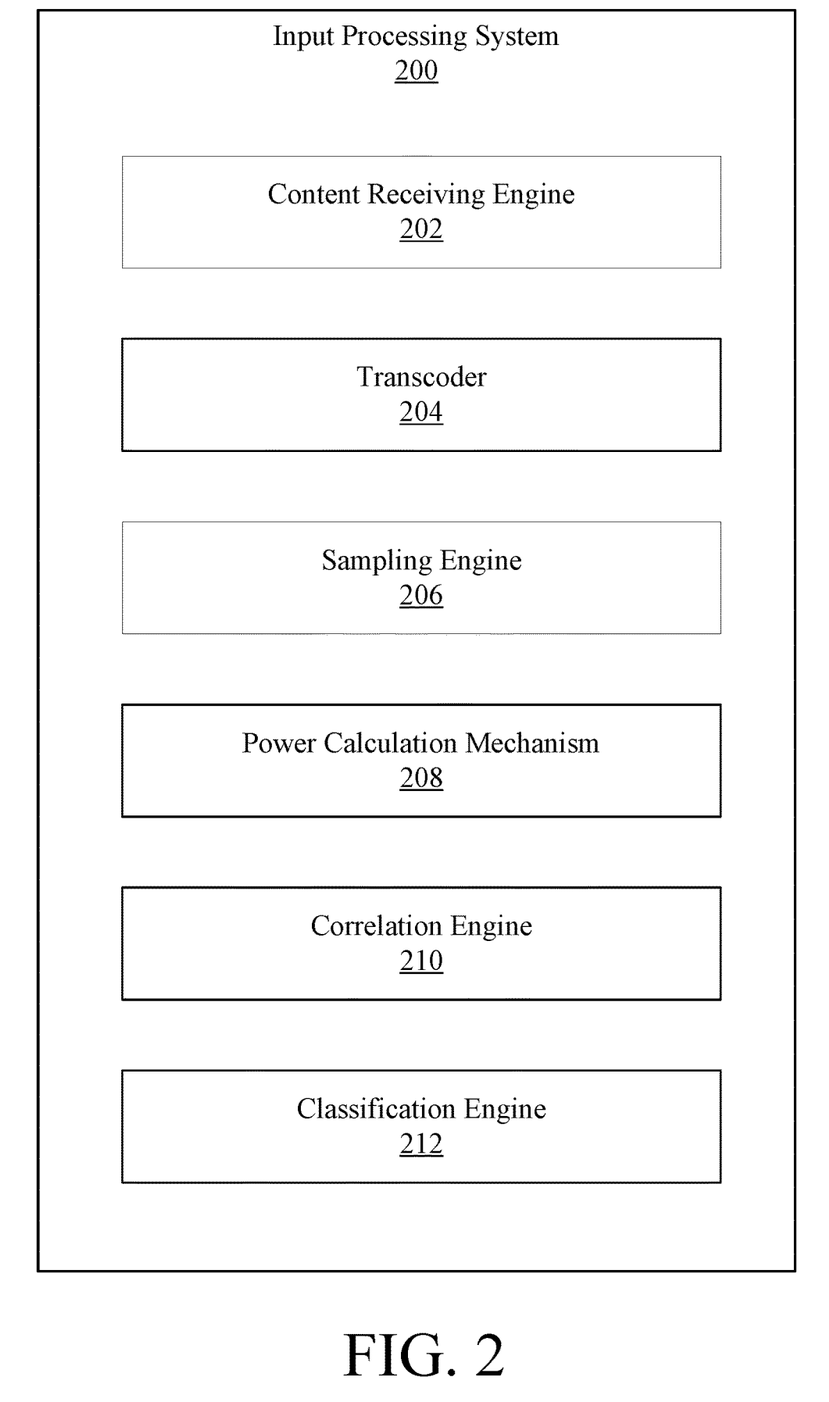
FIG. 2 illustrates an example input processing system for multichannel audio speech classification.

FIG. 2 illustrates an example input processing system for multichannel audio speech classification. The techniques implemented by input processing system 200 may comprise the techniques and data described in system 100 of FIG. 1. Although examples in FIG. 2 and subsequent figures will be discussed in the context of audio signals, the examples are equally applicable to other contexts, such as multimedia signals comprising audio channels. In some examples, one or more components described in FIG. 2 (or the functionality thereof) are distributed across multiple devices or computing systems in one or more computing environments. In other examples, a single device comprises the components described in FIG. 2.

In FIG. 2, input processing system 200 comprises content receiving engine 202, transcoder 204, sampling engine 206, power calculation mechanism 208, correlation engine 210, and classification engine 212. As will be appreciated, the scale of input processing system 200 may vary and may include additional or fewer components than those described in FIG. 2. As one example, the functionality of correlation engine 210 and classification engine 210 may be integrated into a single component.

Content receiving engine 202 is configured to receive input data comprising one or more audio channels. In embodiments, the input data is received from client device(s) 102. Alternatively, in other embodiments, the input data is received directly by input processing system 200. For instance, input processing system 200 may comprise an input sensor, such as a microphone, for receiving input data. In examples, content receiving engine 202 processes the input data to determine whether the input data comprises an audio signal. If the input data is determined to comprise an audio signal, the number of audio channels in the audio signal is determined. If the audio signal is determined to comprise a single audio channel or no audio channels, the content receiving engine 202 may terminate processing of the input data or provide the input data to a different processing component. However, if the audio signal is determined to comprise multiple audio channels, content receiving engine 202 may provide the audio channels for transcoding.

Transcoder 204 is configured to transcode the audio channels to a particular audio format. Examples of audio formats include uncompressed audio formats (e.g., Waveform Audio Format (WAV), Audio Interchange File Format (AIFF), raw Pulse-Code Modulation (PCM)), lossless compression audio formats (e.g., Windows Media Audio (WMA), MPEG-4 SLS, Free Lossless Audio Codec (FLAC)), and lossy compression formats (e.g., WMA Lossy, MP3, Advanced Audio Coding (AAC)). In a specific example, transcoder 204 transcodes each of a first audio channel having an WPA audio format and a second audio channel having an MP3 to a WAV format having a specific bit rate. Transcoding the audio channels to a particular audio format allows for the processing of the audio channels to be standardized.

Sampling engine 206 is configured to identify one or more data windows comprising samples of the audio content within an audio channel. In examples, sampling engine 206 identifies data window(s) based on a set of parameters including, for instance, stride length and window size, and parameter values. The set of parameters may be configured manually using an interface provided by input processing system 200. The interface may provide various interface elements (e.g., radio buttons, dropdown lists, text fields) that enable users to define and store data window parameters for sampling engine 206. Alternatively, the set of parameters may be configured automatically by sampling engine 206. For instance, sampling engine 206 may select a set of parameters based on the length, data size, or audio format of the audio channels. As a specific example, for an audio channel comprising 10,000 samples, sampling engine 206 may set a stride length of 2000 samples and a window size of 500 samples; whereas, for an audio channel comprising 1,000 samples, sampling engine 206 may set a stride length of 200 samples and a window size of 50 samples.

Power calculation mechanism 208 is configured to calculate an average power value for each data window of each audio channel. In an example, the average power value of a data window is calculated by averaging the squares of the amplitude of each sample (e.g., (sample amplitude)). Power calculation mechanism 208 is further configured to calculate an overall average power value for each audio channel based on the average power values for each data window of the audio channel. For example, power calculation mechanism 208 may combine the average power values for each data window of an audio channel using more mathematic operations, such as calculating an average, a sum, etc. The combined value of the average power values for each data window represents the overall average power value for the audio channel.

Correlation engine 210 is configured to determine correlation values between the data windows of different audio channels. The data windows that are correlated encompass the same segment of time in each audio channel. For instance, a first data window to be correlated represents seconds 5-10 of a first and a second audio channel, a second data window to be correlated represents seconds 20-25 of the first and second audio channel, and so on. In examples, the correlation values are determined using a data correlation technique, such as Pearson correlation. In such examples, the correlation values are based on the numerical distance between the average power values for two (or more) data windows. As a specific example, when the average power values for two data windows are close numerically (e.g., within 10 percent), a strong positive correlation may be identified for the two windows. Accordingly, a correlation value indicating the strong positive correlation may be assigned for the two windows, such as +0.8 on a scale of +1.0 to −1.0 (where +1.0 represents a perfect correlation and −1.0 represents a perfect negative correlation). Correlation engine 210 is further configured to determine an overall correlation value between different audio channels. For example, correlation engine 210 may assign an overall correlation value for two audio channels based on the overall average power value for each audio channel.

Classification engine 210 is configured to classify an audio signal based on correlation values for the audio channels within the audio signal. In examples, the classification includes comparing the correlation values for the data windows of the audio channels to one or more threshold values. Alternatively, the classification includes comparing the overall correlation value for the audio channels to one or more threshold values. The threshold value represents a value at which there is a high probability that an audio signal corresponds to a particular audio classification. Based on the comparison of the correlation value(s) to the threshold value, classification engine 210 assigns a classification to the audio signal. For instance, classification engine 210 may assign a classification to an audio signal, such as multi-speaker speech, single speaker speech, speech comprising non-speech audio elements, or non-speech. In some examples, classification engine 210 also provides the correlation value(s) used to determine the classification or a confidence score indicating a probability that the classification for the audio signal is correct.

Figure 3:
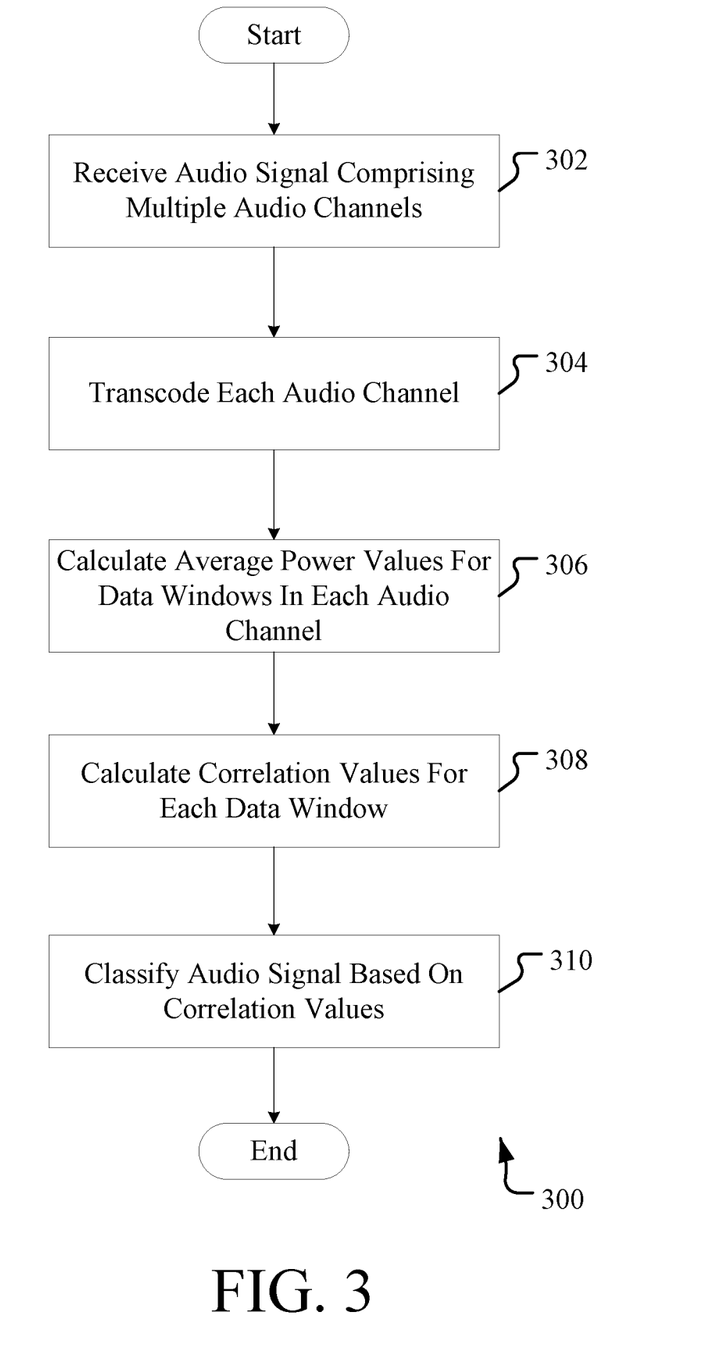
FIG. 3 illustrates an example method for multichannel audio speech classification.

Having described one or more systems that may be employed by the aspects disclosed herein, this disclosure will now describe one or more methods that may be performed by various aspects of the disclosure. In aspects, method 300 may be executed by a system, such as system 100 of FIG. 1. However, method 300 is an example. In other aspects, method 300 is performed by a single device or component that integrates the functionality of the components of system 100. In at least one aspect, method 300 is performed by one or more components of a distributed network, such as a web service or a distributed network service (e.g. cloud service).

FIG. 3 illustrates an example method for multichannel audio speech classification. Example method 300 begins at operation 302, where an audio signal comprising multiple audio channels is received (e.g., received from an external source or accessed locally). The audio signal may be provided as a data file (e.g., a previously generated audio file or video file) or as real-time data (e.g., streaming data or contemporaneously generated data). In some examples, a processing component, such as content receiving engine 202, determines the number of audio channels within the audio signal. If it is determined that the audio signal does not comprise multiple audio channels, the processing component may terminate method 300.

At operation 304, each audio channel in the audio signal is transcoded. Transcoding each audio channel comprises using a transcoder, such as transcoder 304, to convert the audio format of each audio channel to one predetermined audio format. As a specific example, each audio channel in an audio signal is converted from WPA audio format to a WAV format having a bit rate of 16 kHz. In an example where the audio format of the audio channel is already in the predetermined audio format, the audio channel is not transcoded by the transcoder.

At operation 306, an average power value is calculated for data windows of each audio channel. In examples, the data windows for each audio channel are determined using a data windowing component, such as sampling engine 206. The data windowing component selects data windows based on a set of parameters and parameter values. Each data window represents the same segment of time in each audio channel. Calculation logic, such as power calculation mechanism 208, calculates an average power value for each data window for the audio channels. In one example, the average power value for a data window is calculated by squaring each sample in a data window, calculating a sum for the squared samples, and dividing the sum by the number of samples in the data window.

At operation 308, a correlation value is calculated for each data window. The correlation value identifies the strength of a positive or negative correlation between corresponding data windows of the audio channels. Calculating the correlation value comprises using a data correlation technique to determine a relationship, such as a linear relationship, between the average power values of corresponding data windows. As a specific example, if the average power value for a data window of a first audio channel is within a first numerical range (e.g., 10 percent) of the average power value for a corresponding data window of a second audio channel, the data window is assigned a correlation value indicating a strong positive correlation. In this example, if the average power value for a data window of the first audio channel is not within a second numerical range (e.g., 90 percent) of the average power value for a corresponding data window of the second audio channel, the data window is assigned a correlation value indicating a strong negative correlation. In some examples, an overall correlation value is calculated for each audio channel based on the correlation values for each of the data windows for that audio channel.

At operation 310, the audio signal is classified based on the correlation value(s) for the data windows and/or audio channels. In examples, classifying the audio signal comprises using a classification component, such as classification engine 210, to compare the correlation value(s) to one or more threshold values. Based on the comparison of the correlation value(s) to the threshold value(s), the classification component assigns a classification to the audio signal. In some examples, the classification component provides the correlation value(s) used to determine the classification for the audio signal. As a specific example, the classification component provides output that an audio signal is multi-speaker speech based on a calculated correlation value of −0.5. In other examples, the classification component provides a confidence score indicating a probability that the classification for the audio signal is correct. As a specific example, the classification component provides output indicating that there is an 80% probability that the audio signal is multi-speaker speech, a 15% probability that the audio signal is single speaker speech, and a 5% probability that the audio signal is neither multi-speaker speech nor single speaker speech.

In some examples, the classification for the audio signal is used to perform one or more actions. For instance, a sound recognition technique (e.g., audio transcription, diarization, acoustic event detection) is performed based on the classification for the audio signal. In at least one example, the sound recognition technique causes an indication of the sound notification to be provided or a corrective action is initiated.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration, and, as is understood, a vast number of computing device configurations may be utilized for practicing aspects of the disclosure, described herein.

Figure 4:
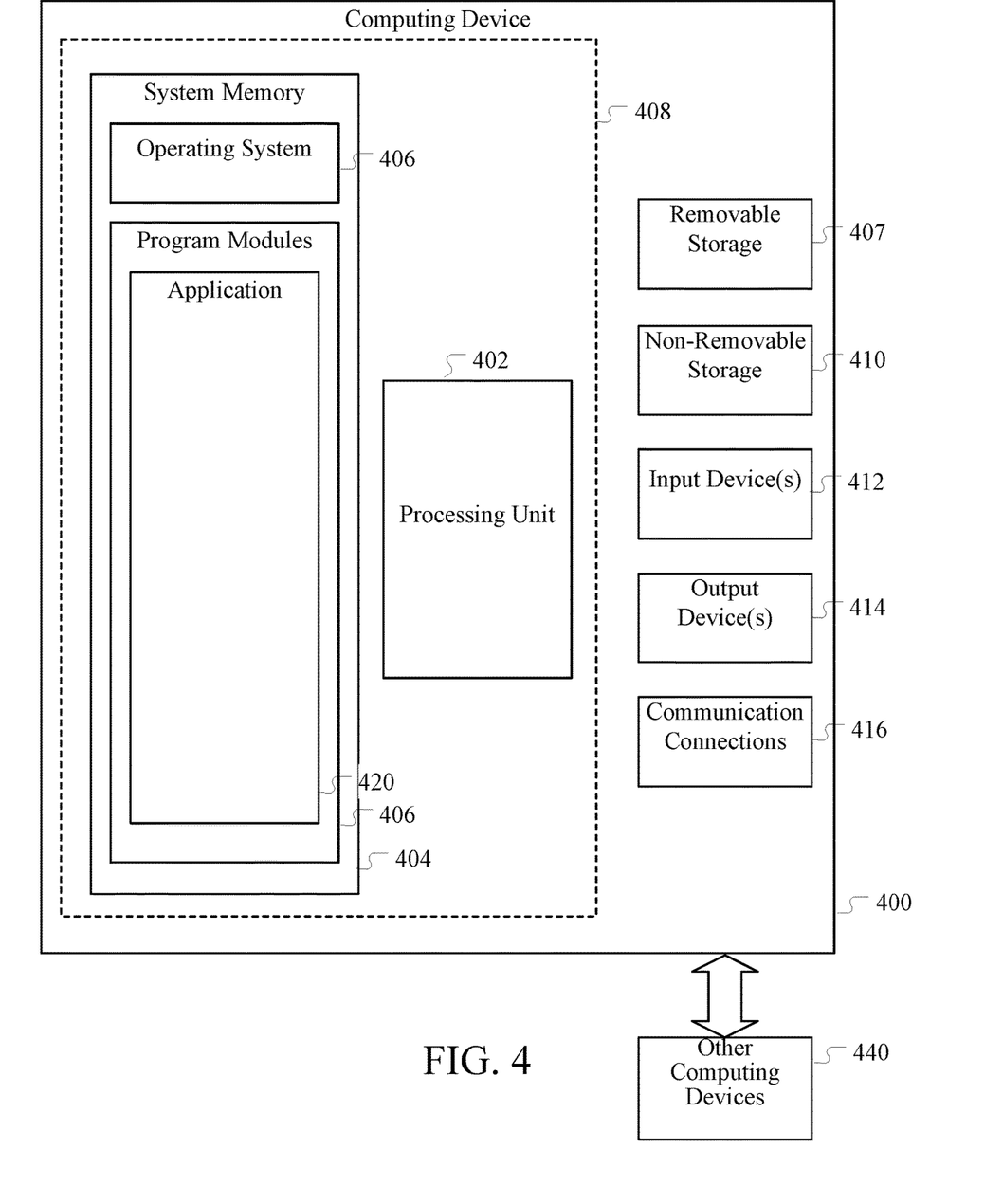
FIG. 4 is a block diagram illustrating example physical components of a computing device for practicing aspects of the disclosure.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing unit 402 and a system memory 404. Depending on the configuration and type of computing device, the system memory 404 may comprise volatile storage (e.g., random access memory), non-volatile storage (e.g., read-only memory), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program. This basic configuration is illustrated in FIG. 4 by those components within a dashed line 408. The computing device 400 may have additional features or functionality. For example, the computing device 400 may include additional data storage devices (removable and/or non-removable) such as, for example, magnetic disks, optical disks, tape, and other computer readable media. Such additional storage is illustrated in FIG. 4 by a removable storage device 407 and a non-removable storage device 410.

The term computer readable media as used herein includes computer storage media. Computer storage media includes volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As stated above, a number of program modules and data files may be stored in the system memory 404. While executing on the processing unit 402, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. Output device(s) 414 such as a display, speakers, a printer, etc. may also be included. The aforementioned devices are examples and others may be used. The computing device 400 may include one or more communication connections 416 allowing communications with other computing devices 440. Examples of suitable communication connections 416 include radio frequency (RF) transmitter, receiver, and/or transceiver circuitry; universal serial bus (USB), parallel, and/or serial ports.

Figure 5A:
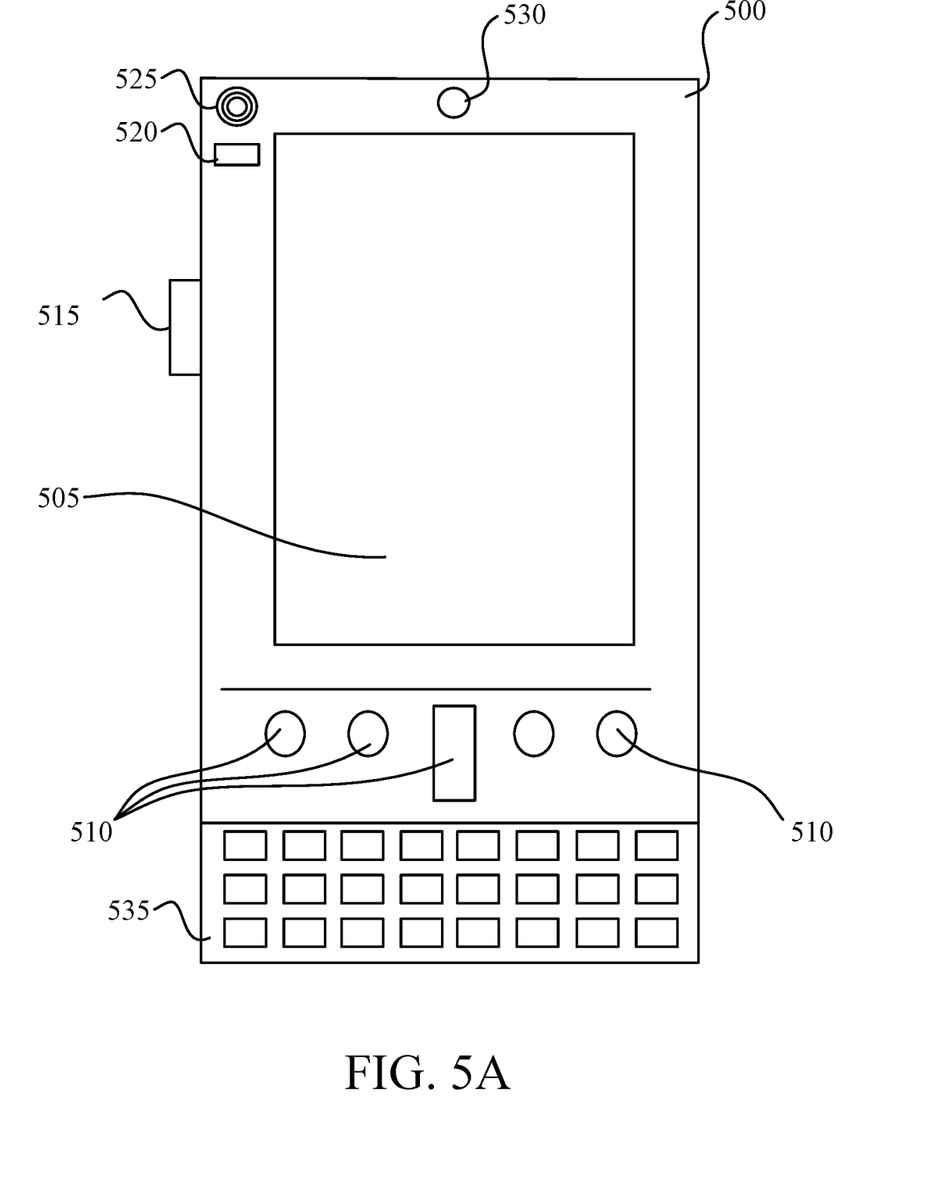
FIGS. 5A and 5B are simplified block diagrams of an example mobile computing device for practicing aspects of the present disclosure.
Figure 5B:
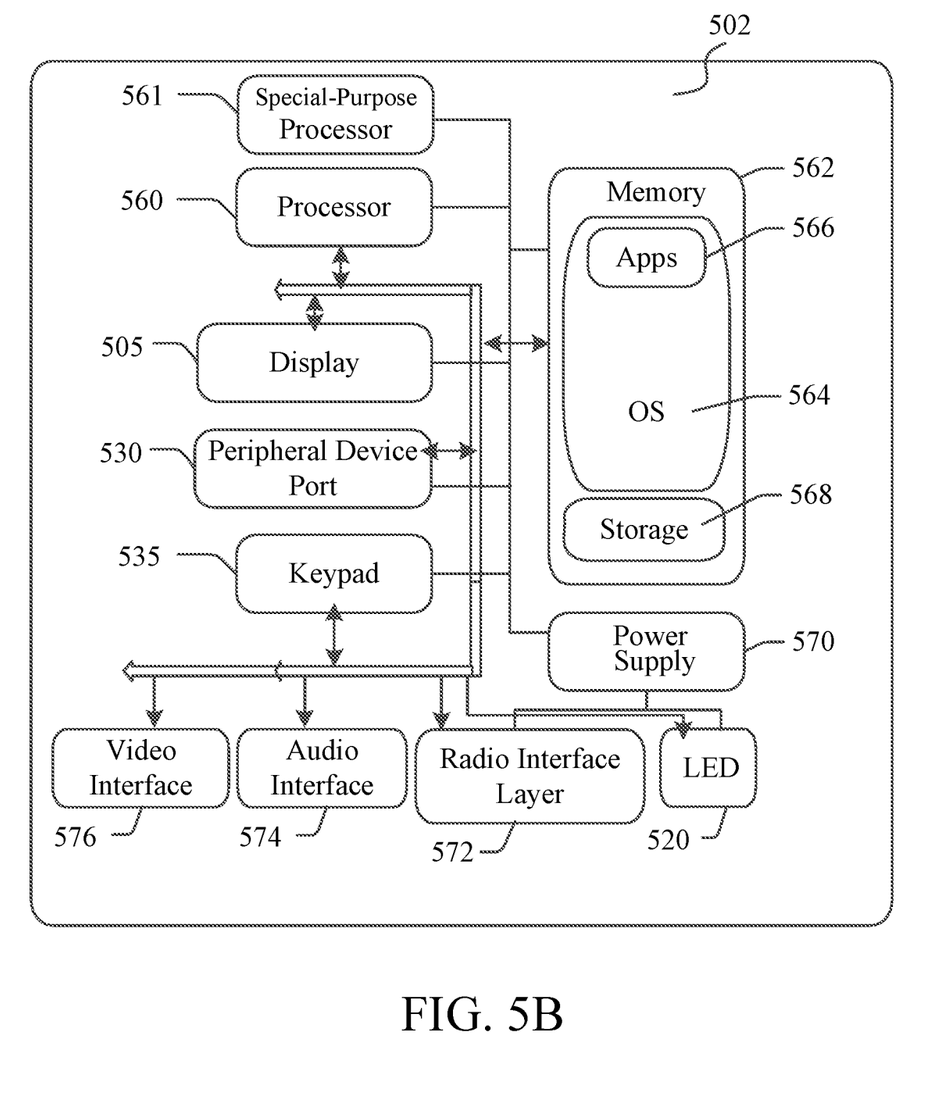

FIGS. 5A and 5B illustrate a mobile computing device 500, for example, a mobile telephone (e.g., a smart phone), wearable computer (such as a smart watch), a tablet computer, a laptop computer, and the like, with which embodiments of the disclosure may be practiced. In some aspects, the client device is a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and may include one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 incorporates more or less input elements. For example, the display 505 may not be a touch screen in some embodiments.

In yet another alternative embodiment, the mobile computing device 500 is a mobile telephone, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system (OS) 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the OS 564, and vice versa.

The visual indicator (e.g., light emitting diode (LED) 520) may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone also serves as an audio sensor to facilitate control of notifications, as will be described below. The system 502 may further include a video interface 576 that enables an operation of a peripheral device port 530 (e.g., an on-board camera) to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data may be readily transferred between computing devices for storage and use according to well-known data transfer and storage means, including electronic mail and collaborative data sharing systems.

Figure 6:
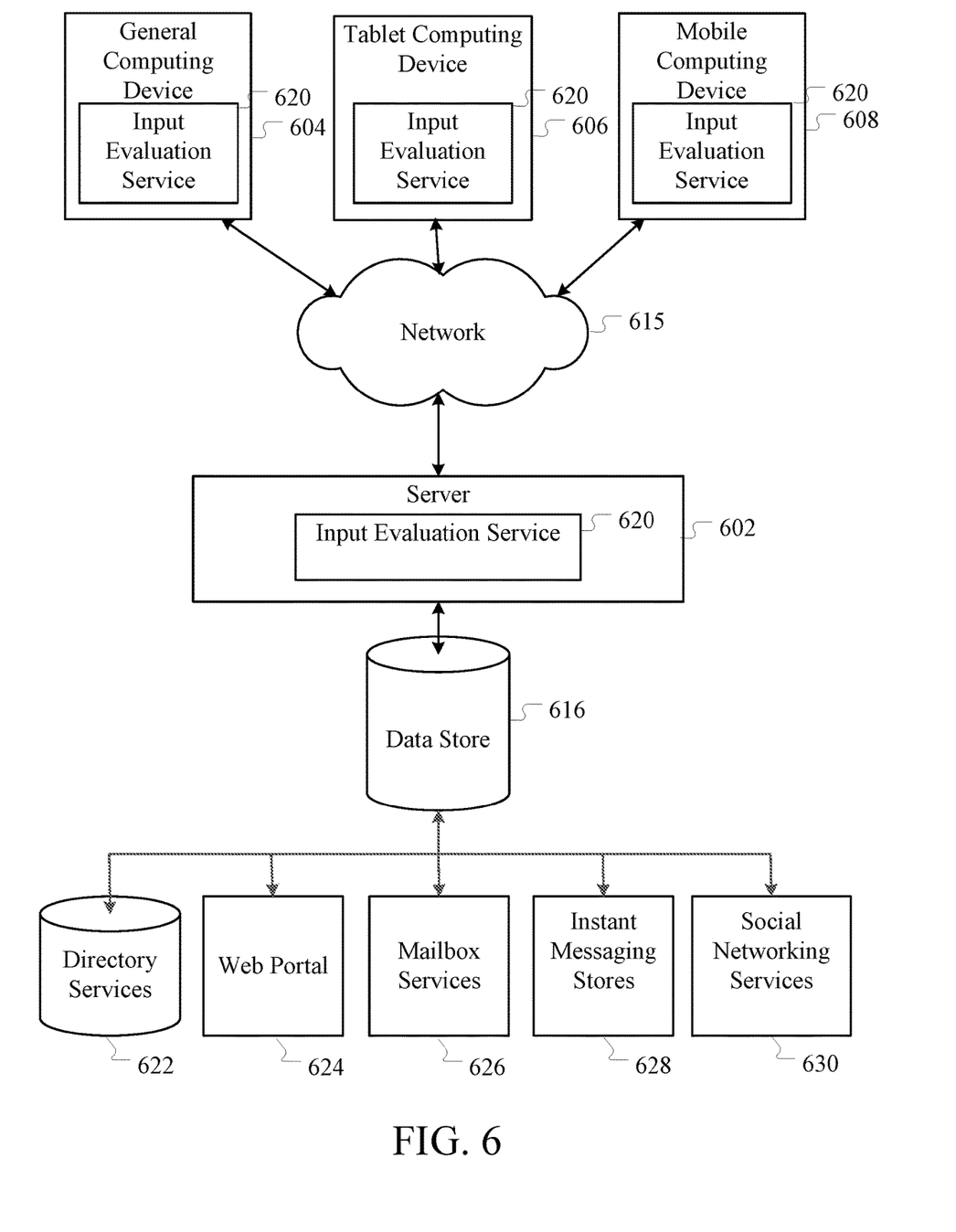
FIG. 6 is a simplified block diagram of an example distributed computing system for practicing aspects of the present disclosure.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using directory services 622, web portals 624, mailbox services 626, instant messaging stores 628, or social networking services 630.

An input evaluation service 620 may be employed by a client that communicates with server device 602, and/or input evaluation service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the data store 616, in addition to receiving graphical data useable to be either pre-processed at a graphic-originating system, or post-processed at a receiving computing system.

Figure 7:
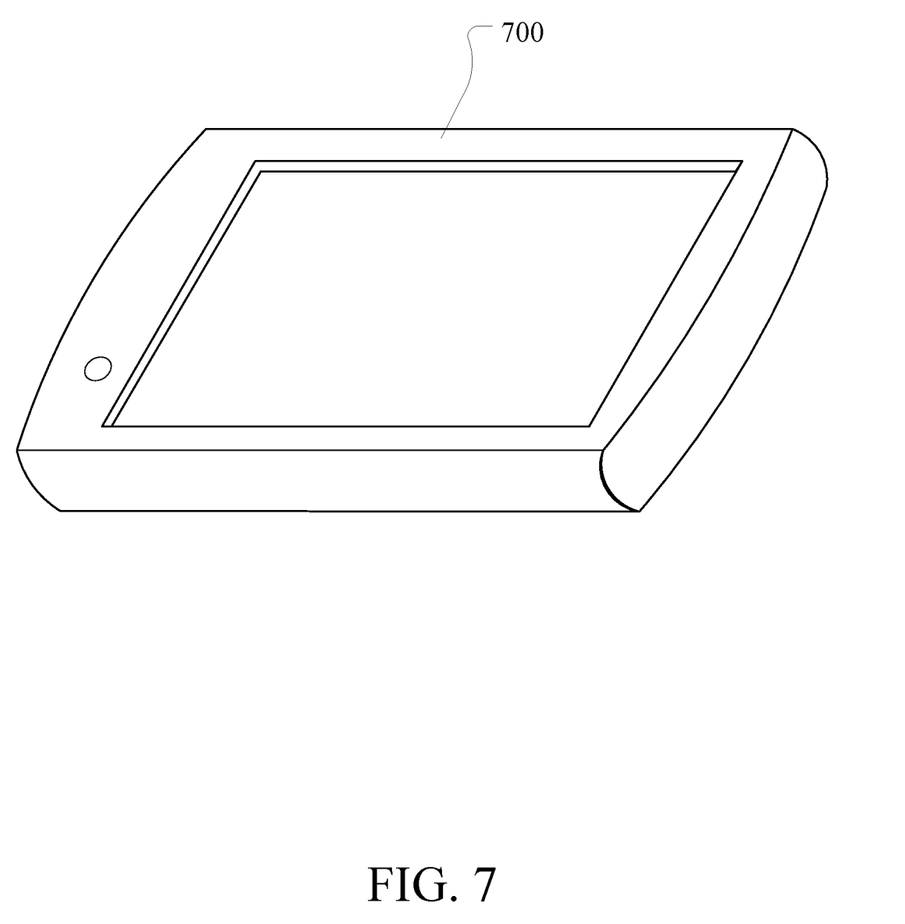
FIG. 7 illustrates an example tablet computing device for executing one or more aspects of the present disclosure.

FIG. 7 illustrates an example of a tablet computing device 700 that may execute one or more aspects disclosed herein. In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As indicated by the foregoing disclosure, one examples of the technology relates to a system comprising: a processor; and memory coupled to the processor, the memory comprising computer executable instructions that, when executed by the processor, perform operations. The operations comprising: receiving an audio signal comprising a first audio channel and a second audio channel; transcoding the first audio channel into a first transcoded audio channel; transcoding the second audio channel into a second transcoded audio channel; calculating a first average power value for a first data window in the first transcoded audio channel; calculating a second average power value for a second data window in the second transcoded audio channel; determining a correlation value for first average power value and the second average power value; and classifying the audio signal based on the correlation value.

In another example, the technology relates to a method. The method comprising: receiving an audio signal comprising a plurality of audio channels; calculating an average power value for a data window in each of the audio channels, the data window representing a same period of time in each of the audio channels; calculating a correlation value based on the average power value for each data window; and classifying the audio signal based on the correlation value.

In another example, the technology relates to a computer readable media storing instructions that, when executed by a computing device, cause the computing device to perform operations comprising: receiving an audio signal comprising a first audio channel and a second audio channel; transcoding the first audio channel into a first transcoded audio channel; transcoding the second audio channel into a second transcoded audio channel; calculating a first average power value for a first data window in the first transcoded audio channel and a second average power value for the first data window in the second transcoded audio channel, the first data window corresponding to a first time period in the audio signal; calculating a third average power value for a second data window in the first transcoded audio channel and a fourth average power value for the second data window in the second transcoded audio channel, the second data window corresponding to a second time period in the audio signal; calculating a first correlation value for first average power value and the second average power value; calculating a second correlation value for third average power value and the fourth average power value; and classifying the audio signal based on the first correlation value and the second correlation value.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, perform operations comprising:
receiving an audio signal comprising a first audio channel and a second audio channel;
transcoding the first audio channel into a first transcoded audio channel;
transcoding the second audio channel into a second transcoded audio channel;
calculating a first average power value for a first data window in the first transcoded audio channel;
calculating a second average power value for a second data window in the second transcoded audio channel;
determining a correlation value for the first data window in the first transcoded audio channel and the second data window in the second transcoded audio channel based on the first average power value and the second average power value, the correlation value identifying:
a positive correlation between the first data window and the second data window;
a negative correlation between the first data window and the second data window; or
a neutral correlation between the first data window and the second data window; and
classifying the audio signal based on the correlation value.

2. The system of claim 1, wherein the audio signal comprises an amplitude of a sound wave over a time period.

3. The system of claim 2, wherein the audio signal comprises samples represented as voltages, each of the samples corresponding to a different time in the time period.

4. The system of claim 1, wherein:
transcoding the first audio channel into the first transcoded audio channel comprises converting the first audio channel from a first audio format to a second audio format; and
transcoding the second audio channel into the second transcoded audio channel comprises converting the second audio channel from the first audio format to the second audio format.

5. The system of claim 1, wherein the method further comprises:
selecting a time period in the audio signal;
determining the first data window corresponds to the time period; and
determining the second data window corresponds to the time period.

6. The system of claim 1, wherein calculating the first average power value comprises:
creating a set of squared samples by calculating a square of each sample in the first data window;
calculating a sum of the set of squared samples; and
dividing the sum by a number of samples in the first data window.

7. The system of claim 1, wherein determining the correlation value comprises correlating the first average power value to the second average power value using Pearson correlation.

8. The system of claim 1, wherein the correlation value further identifies a strength of the positive correlation or the negative correlation between the first average power value and the second average power value.

9. The system of claim 1, wherein classifying the audio signal comprises comparing the correlation value to a threshold value, the threshold value corresponding to a probability that the audio signal corresponds to a particular audio classification.

10. The system of claim 9, wherein classifying the audio signal further comprises providing:
the correlation value; or
a confidence value that the particular audio classification is correct.

11. The system of claim 1, wherein classifying the audio signal comprises assigning a classification to the audio, the classification including:
multi-speaker speech;
single speaker speech; or
speech comprising non-speech audio elements.

12. The system of claim 1, the operations further comprising:
performing a sound recognition technique on the audio signal based on classifying the audio signal.

13. The system of claim 12, wherein the sound recognition technique includes:
speech-to-text conversion of the audio signal; or
speaker diarization of the audio signal.

14. A method comprising:
receiving an audio signal comprising a plurality of audio channels;
calculating an average power value for a data window in each of the plurality of audio channels, the data window representing a same period of time in each of the plurality of audio channels;
calculating a correlation value between the data window in at least two audio channels of the plurality of audio channels based on the average power value for a respective data window of the first audio channel and the second audio channel, the correlation value identifying:
a positive correlation between the respective data window of the first audio channel and the second audio channel;
a negative correlation between the respective data window of the first audio channel and the second audio channel; or
a neutral correlation between the respective data window of the first audio channel and the second audio channel; and
classifying the audio signal based on the correlation value.

15. The method of claim 14, wherein the plurality of audio channels comprises three audio channels.

16. The method of claim 15, wherein two of the three audio channels are in different audio formats.

17. The method of claim 14, wherein the data window is selected based on a predetermined set of parameters.

18. The method of claim 17, wherein the predetermined set of parameters comprises at least stride length and window size.

19. The method of claim 14, wherein the correlation value represents a linear relationship between the average power value associated with each data window.

20. A non-transitory computer readable media storing instructions that, when executed by a computing device, cause the computing device to perform operations comprising:
receiving an audio signal comprising a first audio channel and a second audio channel;
transcoding the first audio channel into a first transcoded audio channel;
transcoding the second audio channel into a second transcoded audio channel;
calculating a first average power value for a first data window in the first transcoded audio channel and a second average power value for the first data window in the second transcoded audio channel, the first data window corresponding to a first time period in the audio signal;
calculating a third average power value for a second data window in the first transcoded audio channel and a fourth average power value for the second data window in the second transcoded audio channel, the second data window corresponding to a second time period in the audio signal;
calculating a first correlation value for the first average power value and the second average power value, the first correlation value identifying a positive correlation, a negative correlation, or a neutral correlation between the first data window in the first transcoded audio channel and the second data window in the second transcoded audio channel;
calculating a second correlation value for the third average power value and the fourth average power value, the second correlation value identifying a positive correlation, a negative correlation, or a neutral correlation between the second data window in the first transcoded audio channel and the second data window in the second transcoded audio channel; and
classifying the audio signal based on the first correlation value and the second correlation value.

* * * * *